US006955475B2

United States Patent
Tajima et al.

(10) Patent No.: US 6,955,475 B2
(45) Date of Patent: Oct. 18, 2005

(54) BEARING APPARATUS FOR A DRIVING WHEEL OF VEHICLE

(75) Inventors: Eiji Tajima, Iwata (JP); Masahiro Ozawa, Iwata (JP); Mitsuru Umekida, Iwata (JP); Hiroyuki Ogura, Iwata (JP)

(73) Assignee: NTN Corporation, Osaka (JP)

( * ) Notice: Subject to any disclaimer, the term of this patent is extended or adjusted under 35 U.S.C. 154(b) by 16 days.

(21) Appl. No.: 10/411,428

(22) Filed: Apr. 10, 2003

(65) Prior Publication Data
US 2003/0210842 A1 Nov. 13, 2003

(30) Foreign Application Priority Data

Apr. 11, 2002 (JP) ........................................ 2002-108756
Aug. 20, 2002 (JP) ........................................ 2002-239375

(51) Int. Cl.[7] .............................. F16C 1/26; F16C 43/08
(52) U.S. Cl. ...................................... 384/544; 464/178
(58) Field of Search .............................. 384/544, 589, 384/537, 584, 585; 29/898.06, 898.07; 301/105.1; 464/178, 905

(56) References Cited

U.S. PATENT DOCUMENTS

| | | | |
|---|---|---|---|
| 6,491,440 B1 * | 12/2002 | Sahashi et al. | ............ 384/544 |
| 6,497,515 B1 * | 12/2002 | Sahashi et al. | ............ 384/544 |
| 6,523,909 B1 * | 2/2003 | Nakamura et al. | ....... 301/105.1 |
| 6,574,865 B2 * | 6/2003 | Meeker et al. | ............ 384/544 |
| 6,739,977 B2 * | 5/2004 | Tajima et al. | ............... 464/178 |

FOREIGN PATENT DOCUMENTS

JP           2002-254901           9/2002

* cited by examiner

Primary Examiner—Thomas R. Hannon
(74) Attorney, Agent, or Firm—Harness, Dickey & Pierce, P.L.C.

(57) ABSTRACT

A bearing apparatus for a driving wheel of vehicle for rotatably supporting the driving wheel relative to a body of a vehicle has a wheel hub, integrally formed with a wheel mounting flange, a constant velocity universal joint and a double row rolling bearing assembled as a unit. A separate inner ring is press fitted onto a cylindrical portion of the wheel hub. An outer joint member of the constant velocity universal joint is fitted within the wheel hub. The bore surface of the wheel hub is formed with a hardened irregular portion. The wheel hub and the outer joint member are integrally connected with making the hardened irregular portion of the wheel hub bite into the outer circumferential surface at a fitting portion of the outer joint member by radially outwardly expanding the fitting portion of the outer joint member. The hardness of the bore surface of the fitting portion of the outer joint member is higher than that of the core portion of the fitting portion of the outer joint member.

12 Claims, 16 Drawing Sheets

(a)  (b)

(a)

(b)

(a)

(b)

(a)

(b)

(a)　　　　　(b)

US 6,955,475 B2

BEARING APPARATUS FOR A DRIVING WHEEL OF VEHICLE

CROSS-REFERENCE TO RELATED APPLICATIONS

This application claims priority to Japanese Patent Application Nos. 2002-108756 filed Apr. 11, 2002 and 2002-239375 filed Aug. 20, 2002, which applications are herein expressly incorporated by reference.

FIELD OF THE INVENTION

The present invention relates to a bearing apparatus for rotatably supporting a driving wheel of vehicle.

BACKGROUND OF THE INVENTION

In recent years, there has been a tendency to reduce the weight of the bearing apparatus which rotatably supports the driving wheel relative to a suspension apparatus of the vehicle in order to improve the fuel consumption. Especially, the bearing apparatus for the driving wheels such as rear wheels of a rear wheel drive vehicle, front wheels of a front wheel drive vehicle and all wheels of a 4WD (4-wheel Drive) vehicle has been improved in its united structure to achieve the driving stability and high rigidity.

As shown in FIG. 19, the bearing apparatus for a prior art driving wheel of vehicle is formed such that a wheel hub 50, a double row rolling bearing 60 and an constant velocity universal joint 70 are assembled as a unit. One of inner raceway surfaces 51 of a double row rolling bearing is formed on the wheel hub 50 and the other of the inner raceway surfaces 72 is formed on an outer joint member 71 of the constant velocity universal joint 70. The wheel hub 50 is formed integrally with a wheel mounting flange 53 to mount a wheel (not shown) on one end of a cylindrical portion 52. Hub bolts 54 that secure the wheel are equidistantly arranged along the periphery of the flange 53. The inner raceway surface 51 is formed on the outer circumferential surface of the cylindrical portion 52 near the wheel mounting flange 53.

The constant velocity universal joint 70 comprises the outer joint member 71, a joint inner ring, a cage and a torque transmission balls (not shown). The outer joint member 71 has a cup shaped mouth portion 73, a shoulder 74 forming the bottom of the mouth portion 73, a stem portion 75 axially extending from the shoulder 74, axially extending curved track grooves 76 formed on the inner surface of the mouth portion 73 and an inner raceway surface 72 formed on the outer circumferential surface of the shoulder 74. The stem portion 75 is inserted into the cylindrical portion 52 of the wheel hub 50 with the end surface of the cylindrical portion 52 abutting the shoulder 74 of the outer joint member 71. The pitch between the inner raceway surfaces 51 and 72 and the internal clearance is defined by the axial positioning of the wheel hub 50 and the outer joint member 71, via the abutment therebetween mentioned above. The stem portion 75 is formed as a hollow configuration by a through bore 77 communicating with the mouth portion 73. An end plate 78 is arranged on the end of the through bore 77 at the side of the mouth portion 73 to prevent leaking of lubricating grease filled within the mouth portion 73.

The double row rolling bearing 60 comprises an outer member 61 and a double row rolling element 62. The outer member 61 has a flange 63 integrally formed therewith to be mounted on a body of vehicle (not shown) and double row outer raceway surfaces 64 and 64 formed on the inner surface thereof. The double row rolling elements 62 and 62 are arranged between the outer raceway surfaces 64 and 64 and the inner raceway surfaces 72 of the outer joint member 71 and rotatably held therein by cages 65 and 65. Seals 66 and 67 are arranged at the ends of the outer member 61 in order to prevent leaking of grease contained within the bearing and also to prevent ingress of rain water or dusts.

The wheel hub 50 is formed with hardened irregular portion 55 on the bore surface of the cylindrical portion 52. The wheel hub 50 and the outer joint member 71 are mutually connected via plastic deformation by radially outwardly expanding the bore of the stem portion 75 and by making the hardened irregular portion 55 to bite into the cylindrical portion 52. When carrying out the radial expanding operation by press work, it is carried out by initially inserting the stem portion 75 into the cylindrical portion 52 of the wheel hub 50. The wheel mounting flange 53 is laid on a pedestal 80. Finally, a caulking jig (punch) 81 is pressed into the through bore 77 of the stem portion 75. The caulking jig (punch) 81 has a large diameter portion 81a larger than the inner diameter of the through bore 77 (see Japanese Laid-Open Patent Publication No. 50846/2001).

In the bearing apparatus for a driving wheel, the load at the side of the wheel mounting flange 53 (i.e. the outboard side) is supported by the radially enlarged portion when the bending moment is applied to the apparatus during turning of the vehicle. Accordingly, the stem portion 75 including the radially enlarged portion is bent and thus the tension and compression stresses are alternately applied to the bore of the stem portion 75. In order to prevent the fatigue failure of the stem portion 75 which would be caused by these repeating stresses, it is necessary to increase the rigidity.

On the contrary, when trying to increase the rigidity of the stem portion 75 by increasing the thickness without changing the size of the apparatus, not only does the press work becomes difficult because of the reduction of the diameter of the through bore 77, but the improvement to the rigidity is limited because of the prevention of reduction of the weight of the apparatus.

SUMMARY OF THE INVENTION

It is an object of the present invention to provide a bearing apparatus for a driving wheel of a vehicle which reduces the weight and the size of the apparatus. Also, the invention prevents the generation of looseness in the secured portion even though a large moment load is applied to the apparatus, thus improving the rigidity and durability of the apparatus.

To achieve the object of the present invention, a bearing apparatus for a driving wheel of a vehicle is provided to rotatably support the driving wheel relative to a body of a vehicle in which a wheel hub, integrally formed with a wheel mounting flange, a constant velocity universal joint and a double row rolling bearing are assembled as a unit. A separate inner ring is press fitted on a cylindrical portion of the wheel hub. An outer joint member of the constant velocity universal joint is fitted within the wheel hub. The bore surface of the wheel hub is formed with a hardened irregular portion. The wheel hub and the outer joint member are integrally connected making the hardened irregular portion of the wheel hub to bite into the outer circumferential surface at a fitting portion of the outer joint member by radially outwardly expanding the fitting portion of the outer joint member. The hardness of the bore surface of the fitting portion of the outer joint member is higher than that of the core portion of the fitting portion of the outer joint member.

In these bearing apparatus for a driving wheel of a vehicle of the first through third generations, it is possible to remarkably improve the durability and the fatigue life of the apparatus due to the application of a repeating load since the fitting portion, which includes the radially expanded portion of the outer joint member, can be bent when the bending moment is applied to the apparatus during turning of the vehicle and the hardness of the bore surface of the fitting portion of the outer joint member is higher than that of the core portion.

Further, according to the present invention, a bearing apparatus for a driving wheel of vehicle is provided to rotatably support the driving wheel relative to a body of the vehicle in which a wheel hub, integrally formed with a wheel mounting flange, a constant velocity universal joint and a double row rolling bearing are assembled as a unit. An outer joint member of the constant velocity universal joint is fitted within the wheel hub. One of the inner raceway surfaces of the double row rolling bearing is formed on the outer circumferential surface of the wheel hub and the other of the inner raceway surfaces is formed on the outer circumferential surface of the outer joint member. The bore surface of the wheel hub is formed with a hardened irregular portion. The wheel hub and the outer joint member are integrally connected making the hardened irregular portion of the wheel hub to bite into the outer circumferential surface at a fitting portion of the outer joint member by radially outwardly expanding the fitting portion of the outer joint member. The hardness of the bore surface of the outer joint member is higher than that of the core portion of the fitting portion of the outer joint member.

In the bearing apparatus for a driving wheel of a vehicle of this fourth generation, it is possible to provide the bearing apparatus which achieves reduction of the weight and size of the apparatus, prevent the looseness in the secured portion although a large moment load is applied to the apparatus and also improve the rigidity and thus the durability of the apparatus.

Preferably, the outer joint member has a hollow configuration with a bottom. This remarkably increases the durability and the fatigue life due to the repeating stresses and also improves the rigidity of the fitting portion of the outer joint member. Especially, it is possible to avoid the lack of rigidity against the bending moment which has been a reason which prevents practical use of the fourth generation.

Preferably, the hardness of the bore surface of the fitting portion of the outer joint member is higher than that of the core portion of the fitting portion of the outer joint member at least by 3 HRC. This makes it possible to remarkably increase the durability and to improve the fatigue life due to the repeating stresses although the fitting portion of the outer joint member, which includes the radially expanded portion, is bent by the bending moment and the alternate tension and compression stresses are applied to the bore surface of the fitting portion.

Preferably, the hardness of the bore surface of the fitting portion of the outer joint member is set within a range of 25 through 40 HRC. This also makes it possible to remarkably increase the durability and to improve the fatigue life due to the repeating stresses.

It is preferable that the bore surface of the fitting portion of the outer joint member is hardened by its own work-hardening caused by insertion of an expanding member being hardening treated into a bore formed by the fitting portion of the outer joint member. This enables manufacturing of the apparatus only by controlling the surface hardness, accuracy of dimension and the operating conditions such as inserting speed without provision of any step for a specially hardening treatment which reduces the manufacturing cost.

It is preferable that a hardened surface is formed on the bore surface of the fitting portion of the outer joint member by shot peening. This can achieve formation of a desired hardened layer throughout the fitting portion including the radially expanded portion of the outer joint member and improvement of the fatigue life.

Preferably, the irregular portion is formed by substantially orthogonally crossed grooves comprising grooves in the circumferential direction and grooves in the axial direction. The apex angle of each projection formed by the crossed grooves is substantially 90°. The projection of first row of the circumferential grooves is configured such that it can reduce the stress concentration when the irregular portion bites into the outer circumferential surface at a fitting portion of the outer joint member. In these bearing apparatus for a driving wheel of vehicle of the first through fourth generations, it is possible to make the hardened irregular portion to bite into the fitting portion although the bending moment is applied to the apparatus during turning of the vehicle and thus the stem portion of the outer joint member is bent. Also, it is possible to increase both the dynamic strength, such as torsional strength, and the static strength, such as pulling-out strength. Further, it is possible to improve the fatigue life by reducing the stress concentration caused by the notch effect of the plastically deformed connecting portion.

Further according to the present invention, a bearing apparatus for a driving wheel of the vehicle is provided where a wheel hub, integrally formed with a wheel mounting flange, a constant velocity universal joint and a double row rolling bearing are assembled as a unit. A separate inner ring is press fitted on a cylindrical portion of the wheel hub. A stem portion, formed on an outer joint member of the constant velocity universal joint, is fitted within the wheel hub. The bore surface of the wheel hub is formed with a hardened irregular portion. The wheel hub and the outer joint member are integrally connected via plastic deformation making the hardened irregular portion of the wheel hub to bite into the outer circumferential surface at a fitting portion of the outer joint member by radially outwardly expanding the fitting portion of the outer joint member. The irregular portion is formed by substantially orthogonally crossed grooves comprising grooves in the circumferential direction and grooves in the axial direction. The apex angle of each projection formed by the crossed grooves is substantially 90°. The projection of first row of the circumferential grooves is configured such that it can reduce the stress concentration when the irregular portion bites into the outer circumferential surface at a fitting portion of the outer joint member.

In these bearing apparatus for a driving wheel of a vehicle of the first through third generations, it is possible to make the hardened irregular portion to bite into the fitting portion although the stem portion of the outer joint member is bent and the repeating stresses are generated. In addition, it is possible to increase both the dynamic strength and the static strength. Also, it is possible to improve the fatigue life by reducing the stress concentration caused by the notch effect of the plastically deformed connecting portion.

In addition, according to the present invention, a bearing apparatus for a driving wheel of the vehicle is provided with a wheel hub, integrally formed with a wheel mounting flange, a constant velocity universal joint and a double row rolling bearing assembled as a unit. One of the inner raceway surfaces of the double row rolling bearing is formed on the outer circumferential surface of the wheel hub and the other of the inner raceway surfaces is formed on the outer circumferential surface of the outer joint member. A stem portion, formed on an outer joint member, is fitted within the wheel hub. The bore surface of the wheel hub is formed with a hardened irregular portion. The wheel hub and the outer joint member are integrally connected via plastic deformation making the hardened irregular portion of the wheel hub to bite into the outer circumferential surface at a fitting portion of the outer joint member by radially outwardly expanding the fitting portion of the outer joint member. The irregular portion is formed by substantially orthogonally crossed grooves comprising grooves in the circumferential direction and grooves in the axial direction. The apex angle of each projection formed by the crossed grooves is substantially 90°. The projection of first row of the circumferential grooves is configured such that it can reduce the stress concentration when the irregular portion bites into the outer circumferential surface at a fitting portion of the outer joint member.

In the bearing apparatus for a driving wheel of vehicle of this fourth generation, it is possible to achieve further reduction of weight and size as well as to improve the rigidity and strength of the stem portion and thus the durability of the apparatus.

According to the present invention, a bearing apparatus for a driving wheel of a vehicle is provided with a wheel hub, integrally formed with a wheel mounting flange, a constant velocity universal joint and a double row rolling bearing assembled as a unit. A separate inner ring is press fitted on a cylindrical portion of the wheel hub, The bore surface of the inner ring is formed with a hardened irregular portion. The wheel hub and the inner ring are integrally connected via plastic deformation making the hardened irregular portion of the inner ring to bite into the cylindrical portion of the wheel hub by radially outwardly expanding the cylindrical portion of the wheel hub. The irregular portion is formed by substantially orthogonally crossed grooves comprising grooves in the circumferential direction and grooves in the axial direction. The apex angle of each projection formed by the crossed grooves is substantially 90°. The projection of first row of the circumferential grooves is configured such that it can reduce the stress concentration when the irregular portion bites into the outer circumferential surface at a fitting portion of the outer joint member.

This structure provides the bearing apparatus for a driving wheel of the third generation of so-called a self-retain type with a bearing portion combined with the wheel hub as a sub-unit which maintains the internal clearance therebetween. In addition, detachment of the wheel hub from the constant velocity universal joint is possible. The connection, via plastic deformation, can provide sufficient strength although a large bending moment is applied to the apparatus and thus can improve the durability of the apparatus.

Preferably, the stem portion of the outer joint member is inserted into the wheel hub via serrations. An engaging groove is formed in each of the serrations at the outboard side. The wheel hub and the outer joint member are detachably mounted to each other via a split clip to be fitted within the engaging grooves. This arrangement enables detachment between the wheel hub and the constant velocity universal joint by "one-touch" operation and thus improves the workability in disassembly and also reduces the weight and size of the apparatus.

Also preferably, the projections in the first row of the circumferential grooves are configured such that each of the projections has an axially extending flat tip end. This arrangement enables the first row of the circumferential grooves to be contacted with the fitting portion of the stem portion via a surface contact and thus to reduce the stress concentration.

Preferably, the irregular portion is formed by substantially orthogonally crossed grooves comprising a plurality of independent annular grooves, formed by turning, and a plurality of axially extending grooves, formed by broaching. The innermost diameter formed by the projection and the crossed grooves is formed by the axially extending grooves. According to this arrangement, it is possible to control the groove diameter in high accuracy using the BDP ("Between Pin Diameter") measurement and thus to ensure the desired tip configuration of the projection.

Further preferably, the configuration of each projection of the crossed grooves is substantially a square pyramid. According to this arrangement, it is possible to obtain sufficient strength against the torsional torque and pulling-out load. Also, it is possible to obtain the connection via plastic deformation having sufficient durability although excessive bending moment is applied during turning of vehicle.

BRIEF DESCRIPTION OF THE DRAWINGS

Additional advantages and features of the present invention will become apparent from the subsequent description and the appended claims, taken in conjunction with the accompanying drawings, wherein:

FIG. 2(*b*) is a longitudinal section view showing a criss-cross pattern knurl formed by mutually crossed axial grooves and independent annular grooves as an irregular portion;

FIG. 3(*b*) is a partially enlarged section view of FIG. 3(*a*);

FIG. 5(*b*) is a partially sectional view for explaining a method for carrying out the radial expansion;

FIG. 7(*b*) is a longitudinal section view showing the axial groove forming irregular portions of the wheel hub of the present invention;

DESCRIPTION OF THE PREFERRED EMBODIMENTS

Figure 1:
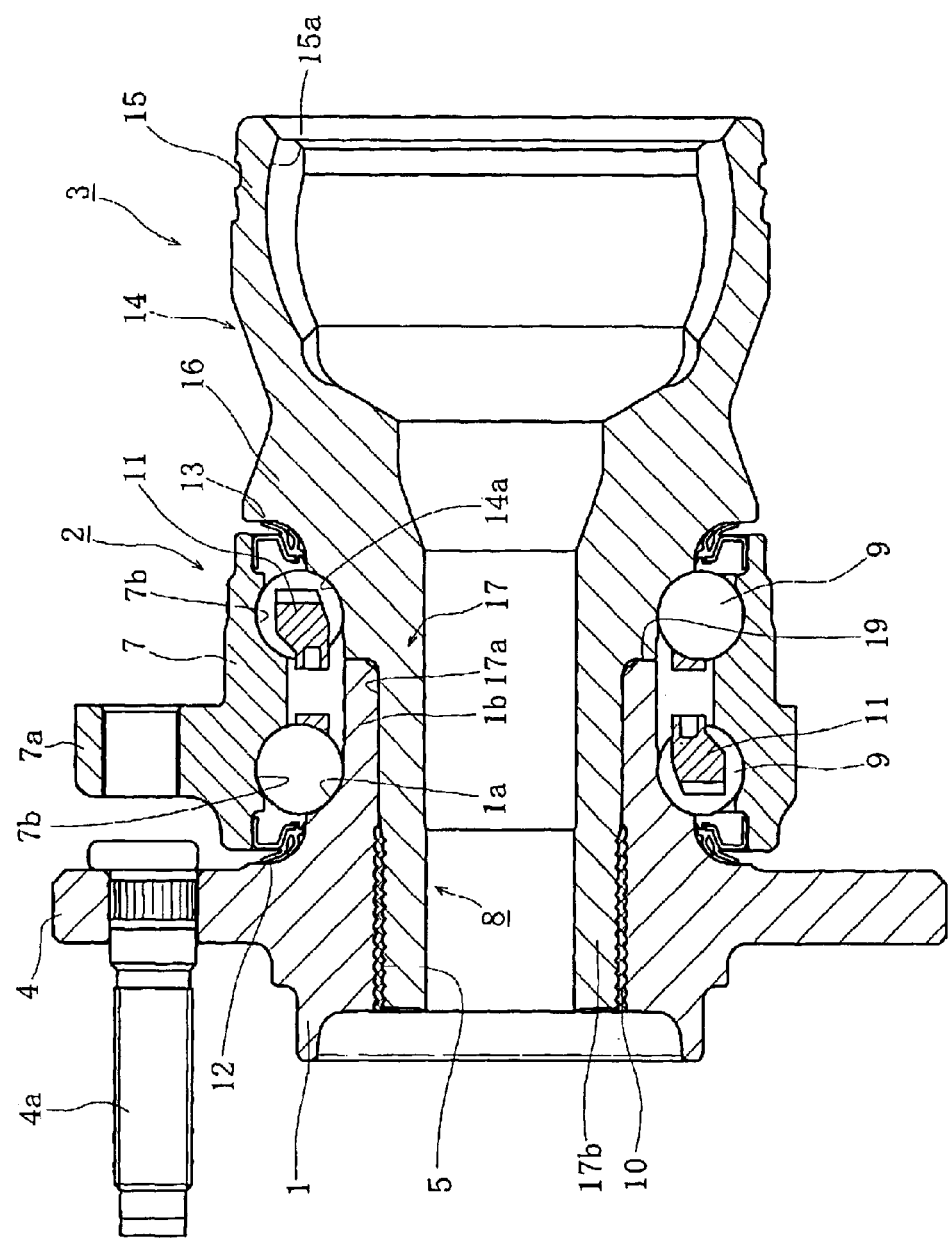
FIG. 1 is a longitudinal section view of a first embodiment of the bearing apparatus for a driving wheel of the present invention.

Preferred embodiments of the present invention will be hereinafter described with reference to the accompanied drawings. FIG. 1 is a longitudinal section view showing a first embodiment of a bearing apparatus for a driving wheel of a vehicle of the present invention.

The apparatus comprises a wheel hub 1, a double row rolling bearing 2 and a constant velocity universal joint 3 which are assembled as a unit. In the description below, a term "outboard side" of the apparatus denotes a side which is positioned outside of the vehicle body and a term "inboard side" of the apparatus denotes a side which is positioned inside of the body when the apparatus is mounted on the vehicle body.

The wheel hub 1 is formed integrally with a wheel mounting flange 4 at the outboard side of the wheel hub. A wheel (not shown) is mounted by hub bolts 4a which are equidistantly arranged on the flange 4 along its periphery. The bore surface of the wheel hub 1 is formed with an irregular portion 5. The irregular portion 5 is heat treated to have a hardened layer 10 shown by a cross-hatching in FIG. 1 with a surface hardness of HRC 54~64. It is preferable to use high frequency induction heating as the heat treatment which can easily carry out a local heating and a setting of the depth of a hardened layer.

Figure 2:
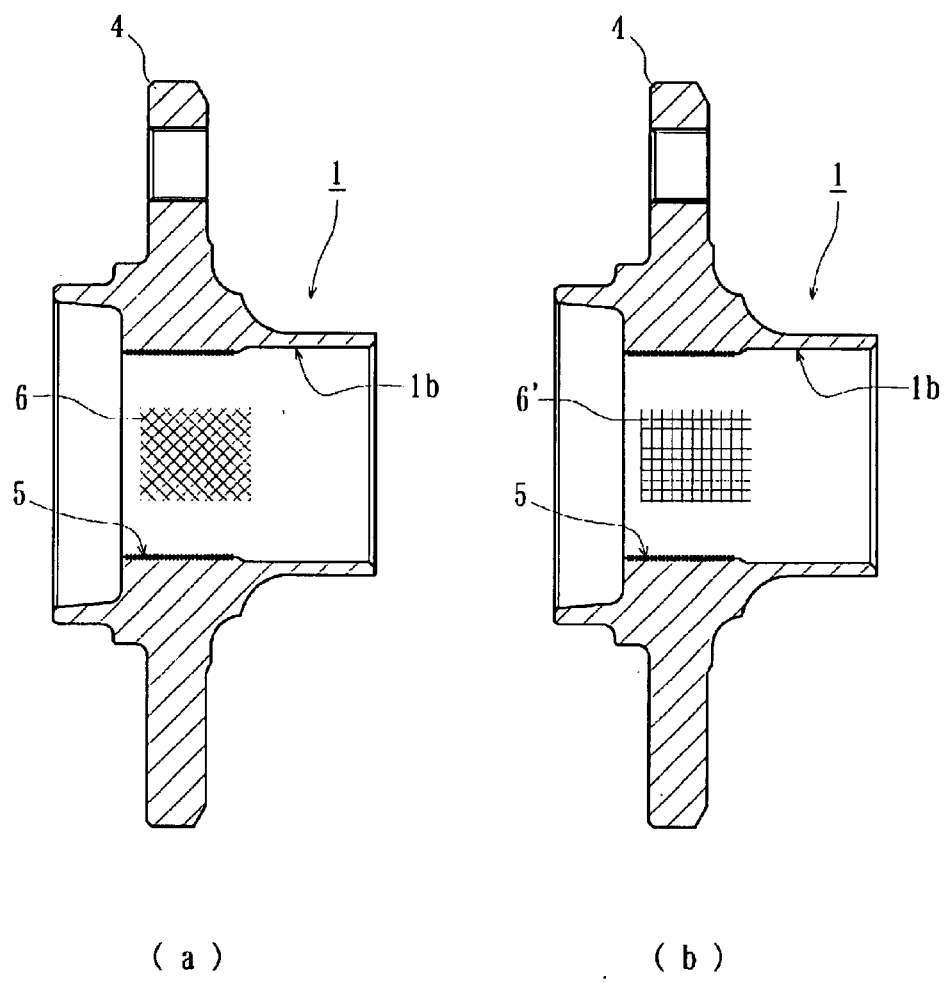
FIG. 2(*a*) is a longitudinal section view showing a criss-cross pattern knurl formed by mutually inclined helical grooves as an irregular portion.

FIG. 2 shows example of the irregular portion 5 in which FIG. 2(a) shows an example of the irregular portion 5 comprising mutually inclined helical grooves 6. FIG. 2(b) shows another example of the irregular portion 5 of crossed grooves 6' comprising axial grooves and independent annular grooves. It is preferable to form the irregular portion by pointed projections.

The double row rolling bearing 2 comprises an outer member 7, inner member 8 and a double row rolling elements 9 and 9. The outer member 7 is integrally formed on its outer circumferential surface with a body mounting flange 7a and on its bore surface with double row outer raceway surfaces 7b and 7b. On the other hand, the inner member 8 comprises the wheel hub 1 and an outer joint member 14, hereinafter described, and inner raceway surfaces 1a and 14a opposing the outer raceway surfaces 7b and 7b. The inner raceway surfaces 1a and 14a are integrally formed on the outer circumferential surfaces of the wheel hub 1 and the outer joint member 14, respectively. The double row rolling elements 9 and 9 are contained between the outer raceway surfaces 7b and 7b and the inner raceway surfaces 1a and 14a. The rolling elements 9 and 9 are freely rotatably held therein by cages 11 and 11. Seals 12 and 13 are arranged at the ends of the bearing 2 to prevent leakage of grease contained within the bearing 2 as well as ingress of rain water or dusts. The illustrated ball rolling elements 9 and 9 may be replaced for example by conical rolling elements.

The constant velocity universal joint 3 comprises a joint inner ring, a cage and torque transmitting balls (not shown) other than the outer joint member 14. The outer joint member 14 has a cup-shaped mouth portion 15, a shoulder 16 forming the bottom of the mouth portion 15, a stem portion 17 axially extending from the shoulder 16, and an axially extending curved track groove 15a formed on the inner surface of the mouth portion.

The outer joint member 14 is formed with the inner raceway surface 14a around the outer circumferential surface of the shoulder 16. The stem portion 17 of the outer joint member 14 has a stepped portion of small diameter 17a and a fitting portion 17b. The spigot portion 1b of the wheel hub 1 is fitted into the stepped portion of small diameter 17a and the end surface 19 of the spigot portion 1b is abutted against the shoulder 16 of the outer joint member 14. The wheel hub 1 and the outer joint member 14 are integrally connected via plastic deformation of the fitting portion 17b of the outer joint member 14, making the hardened irregular portion 5 of the wheel hub 1 bite into the outer circumferential surface at the fitting portion of the outer joint member 14.

A mandrel is inserted in and pulled out of the bore of the fitting portion 17b fitted in the bore of the wheel hub 1 to radially outwardly expand the fitting portion 17b of the outer joint member 14. The fitted portion, via plastic deformation, has both a torque transmitting function and a jointing function of the wheel hub 1 and the outer joint member 14. Thus, provision of a torque transmitting means, such as a conventional serration means on the wheel hub 1 and the outer joint member 14 as well as securing means such as nuts, is not required. Accordingly, it is possible to realize further reduction of the weight and size of the apparatus.

Figure 3:
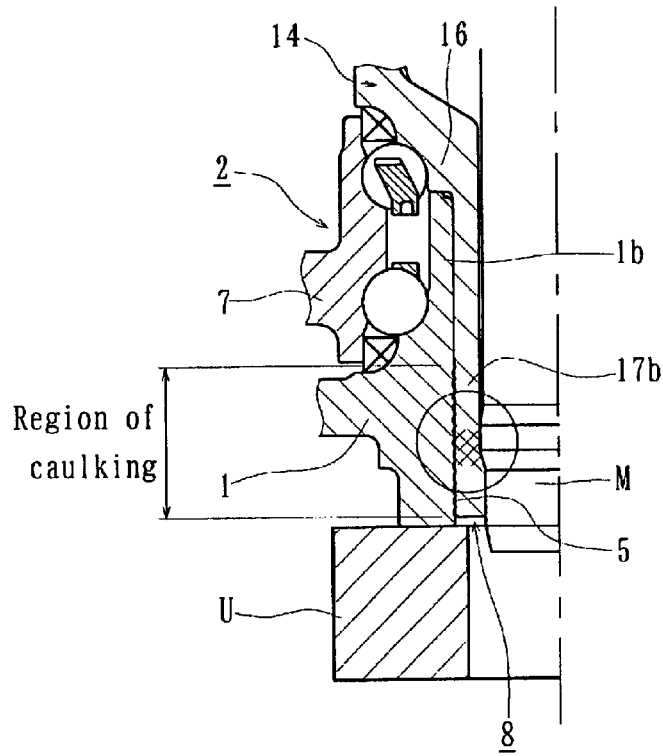
FIG. 3(*a*) is an explanatory view showing a method for connection via plastic deformation in the bearing apparatus for a driving wheel of the present invention.
Figure 3:
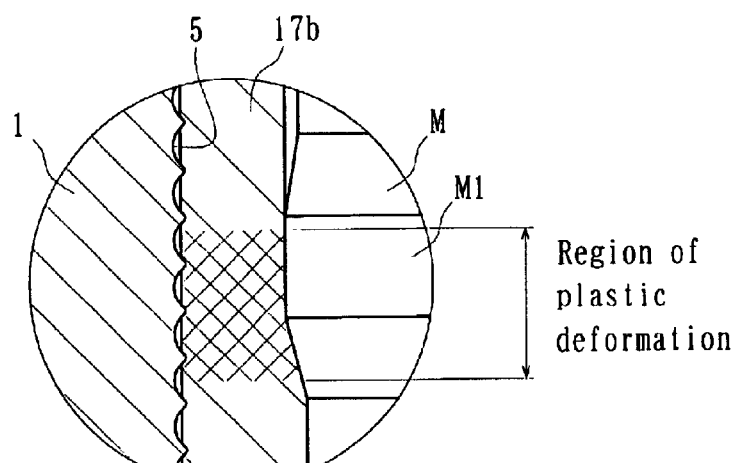

The caulking can be carried out, as shown in FIGS. 3(a) and (b). First, the inner member 8 is placed on a pedestal "U" and then mandrel "M" is inserted into the outer joint member 14 from the inboard side to the outboard side. Since the spigot portion 1b of the wheel hub 1 is axially compressed between the shoulder 16 of the outer joint member 14 and the pedestal "U" and the fitting portion (cross-hatched portion) 17b is radially outwardly expanded, the residual compressive stress is still kept after the plastic deformed connection. Accordingly no axial clearance is caused at the abutted portion between the spigot portion 1b and shoulder 16. Thus, the internal clearance of the double row rolling bearing 2 can be maintained at an initially set negative clearance.

Figure 4:
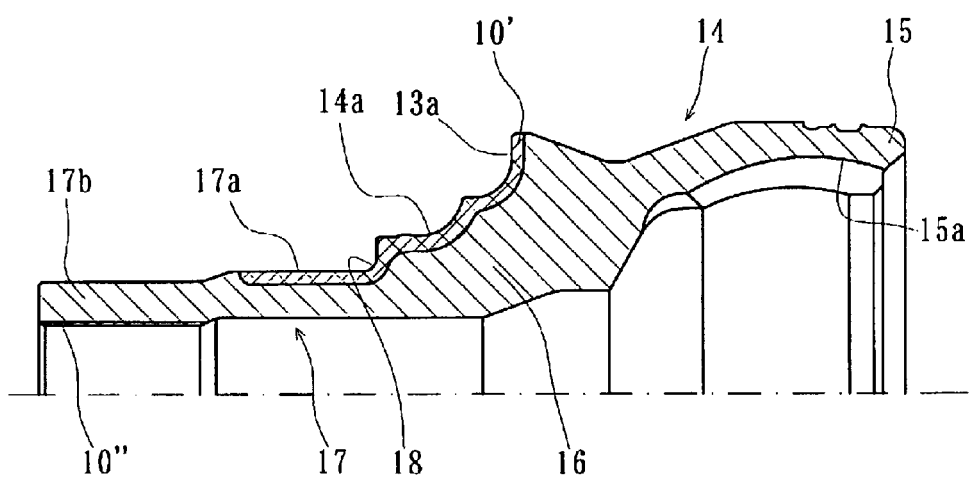
FIG. 4 is a longitudinal section view of an outer joint member of the bearing apparatus for a driving wheel of the present invention.

The outer joint member 14 is made of medium carbon steel including carbon of 0.40 through 0.60 wt % such as S53C or case-hardened steel such as SCR 430. As shown in FIG. 4, the outer joint member 14 is formed with a hardened layer 10' at a region from the seal land portion 13a on which the seal 13 slidably contacts the stepped portion of small, diameter 17a of the stem portion 17 through the inner raceway surface 14a. It is preferable to carry out the heat treatment by high frequency induction heating. It is also preferable to keep the fitting portion 17b as a no-quenched portion having surface hardness less than HRC 24 and to set the surface hardness of the irregular portion 5 of the wheel hub 1 at about HRC 54~64 to hold a difference in the hardness between the irregular portion 5 and the fitting portion 17b larger than HRC 30. This enable the irregular portion 5 to easily bite into the fitting portion 17b without causing deformation of the irregular portion 5 to tightly combine them via the plastic deformation.

From the endurance test following radially expanding conditions, it has been found that (i) the higher the hardness of the mandrel is, the better the wear and the variation of radial expansion of the mandrel are controlled; (ii) sufficient strength of connection against the repeating bending load can be obtained by biting with each other into 80% of the depth of the irregular portion; (iii) the amount of radial expansion and the margin of radial expansion are mutually proportional, and the amount of radial expansion is within a range of 80% through 90% of the difference of dimension between the large diameter portion of the mandrel and the inner portion of the fitting portion although it has a somewhat variation according to the error in dimension and the surface roughness of the members to be fitted; (iv) the surface of the bore is work hardened by the radial expansion of the fitting portion and the tensile stress of the surface becomes 60% of the allowable stress of the material as well as the difference in hardness of the surface and the core portion becomes substantially 3 HRC; (v) the mandrel is inserted preferably at a constant low speed since cracks would be caused at the fitting portion at a high speed. From the facts above, the surface hardness of the mandrel "M" is set at 54 HRC. In addition, the dimension M1 of the large diameter portion and the inner diameter of the fitting portion 17b are set so that the amount of radial expansion becomes substantially at 80% of the depth of the irregular portion 5.

The abutted portion of the wheel hub 1 and the outer joint member 14 functions as a node and suffers from repeating bending moment when excessive bending moment arises during turning of the vehicle. During which, excessive stress tends to be caused at the spigot portion 1b of the wheel hub 1 and the stem portion 17 of the outer joint member 14, especially at a corner 18 of the stepped portion of small diameter 17a and thus the durability would be reduced. In addition, abnormal abrasion would be caused in the abutted portion of the spigot portion 1b and the stepped portion of small diameter 17a due to their deformation or abraded debris would enter into the bearing. However, the provision of the hardened layer 10' on the surface of the stepped portion of small diameter 17a from the seal land portion 13a to the corner 18 enables an increase in strength and durability against the torsional moment and also suppress the generation of abrasion even though relative slippage is caused by the repeated bending moment at the abutted portion between the spigot portion 1b and the shoulder 16.

Another hardened layer 10" is formed on the bore surface of the fitting portion 17b. The surface hardness thereof is set at a region 25 through 40 HRC and has a difference in hardness at least 3 HRC relative to the core. This makes it possible to increase the durability although repeating tensile and compression stresses are caused in the fitting portion by the bending moment.

Although not illustrated, an end cap is usually arranged at an end of the outer joint member 14 in order to prevent leakage of grease, contained within the mouth portion 15, and ingress of dusts from the outside.

Figure 5:
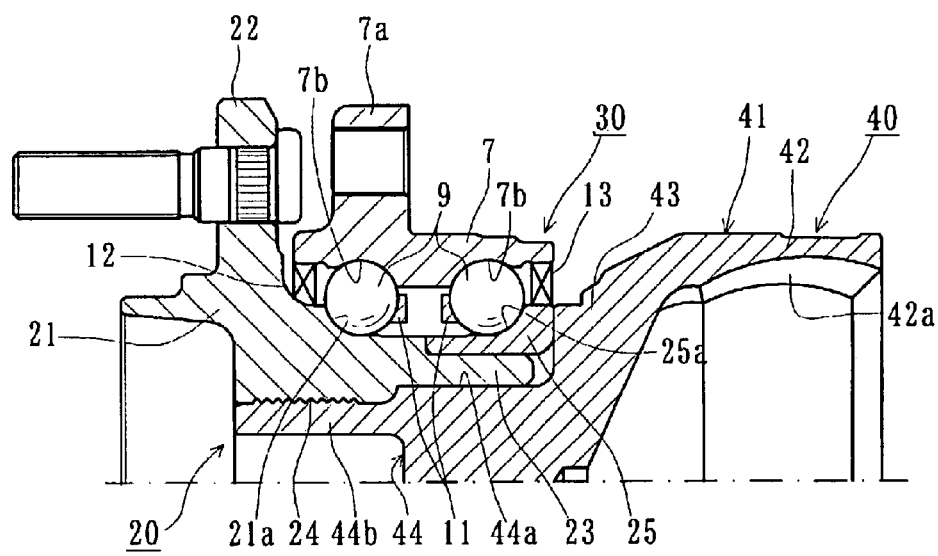
FIG. 5(*a*) is a longitudinal section view showing a second embodiment of the bearing apparatus for a driving wheel of the present invention.
Figure 5:
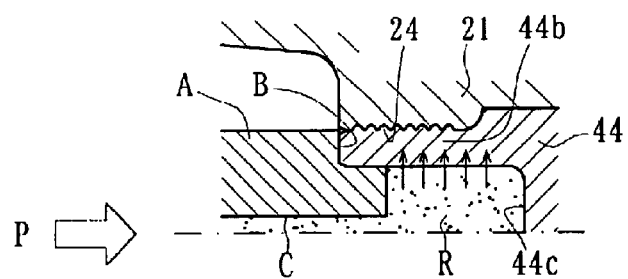

FIG. 5(a) is a longitudinal section view of a second embodiment of the bearing apparatus for a driving wheel of the present invention. Same reference numerals are used for designating the same parts as those used in the first embodiment.

The second embodiment has a structure so-called a "third generation" where an inner member 20, a double row rolling bearing 30 and a constant velocity universal joint 40 are assembled as a unit. The inner member 20 denotes the wheel hub 21 and the outer joint member 41 of the constant velocity universal joint 40.

The wheel hub 21 is formed integrally with a wheel mounting flange 22 for mounting a wheel (not shown). Hub bolts secure the wheel and are equidistantly arranged along the periphery of the flange 22. The outer circumferential surface of the wheel hub 21 is formed with an inner raceway surface 21a and a spigot fitting portion 23. A separate inner ring 25 is press fitted onto the spigot portion 23. The inner ring 25 is assembled on the spigot portion 23 abutting a shoulder 43 of the outer joint member 41 hereinafter described.

The double row rolling bearing 30 comprises the outer member 7, the inner member 20, and the double row rolling elements 9 and 9. The outer member 7 is integrally formed with the flange 7a to be mounted on a body of a vehicle (not shown). The double row outer raceway surfaces 7b and 7b are formed on the inner surface thereof. On the other hand, the inner member 20 has double row inner raceway surfaces 21a and 25a formed on the outer circumferential surfaces of the wheel hub 21 and the inner wheel 25, respectively. Thus, the inner raceway surfaces 21a and 25a are opposed to the double row outer raceway surfaces 7b and 7b. Double row rolling elements (balls) 9 and 9 are arranged between the outer raceway surfaces 7b and 7b and the inner raceway surfaces 21a and 25a.

The wheel hub 21 is made of medium carbon steel including carbon of 0.40 through 0.60 wt % such as S53C. The inner raceway surface 21a of the outboard side, seal land portion 13a and the spigot portion 23 to which the seal 12 contacts are hardened on their surfaces by the high frequency induction heating. On the other hand, the inner ring 25 is made of high carbon chrome bearing steel including carbon of 0.95 through 1.10 wt % and is hardening treated from the surface to the core thereof.

The outer joint member 41 of the constant velocity universal joint 40 comprises the mouth portion 42, the shoulder portion 43, forming the bottom of the mouth portion 42, and the stem portion 44 axially extending from the shoulder 43. The stem portion 44 comprises the stepped portion of small diameter 44a and the fitting portion 44b having a hollow configuration opened to the outboard side.

The outer joint member 41 is made of medium carbon steel including carbon of 0.40 through 0.60 wt % such as S53C. The surfaces of axially extending curved track groove 42a formed on the inner surface of the mouth portion 42, the shoulder portion 43, and the stepped portion of small diameter 44a are hardened by the high frequency induction heating. The fitting portion 44b is remained as its rare condition without any heat treatment.

The bore surface of the wheel hub 21 is formed with a hardened irregular portion 24, and the wheel hub 21 and the outer joint member 41 are integrally connected making the hardened irregular portion 24 of the wheel hub 21 bite into the outer circumferential surface at a fitting portion 44b of the outer joint member 41 by radially outwardly expanding the fitting portion 44b of the outer joint member 41.

One method for radially expanding the fitting portion 44b will be described with reference to FIG. 5(b). First, a punch "A" is inserted into the bore of the fitting portion 44b to form a closed space cooperating with the bottom 44c of the stem portion 44. The punch "A" is formed with a stepped portion "B" and a through bore "C". Then viscous fluid "R" such as silicone oil is fed through the bore "C" into the closed space and fills this space. The fitting portion 44b is radially expanded as shown by arrows by instantaneously applying pressure "P" to the viscous fluid "R". High viscous fluid such as silicone oil can simplify the sealing means since such high viscous fluid enables the stepped portion "B" to be used as sealing means. However, the viscous fluid "R" may be any fluid other than silicone oil if it is fluid enable the radial expansion of the fitting portion at a static pressure.

According to the present embodiment, after completion of connection of the wheel hub 21 and the outer joint member 41, via plastic deformation therebetween, the bore of the fitting portion is worked by shot peening to keep the surface hardness of the formed hardened layer at a level higher than 25 HRC. It is possible to provide the difference in hardness at least more than 3 HRC between the surface and the core of the fitting portion after forging. This makes it possible to have a higher hardness than that in case of the first embodiment and thus to further improve the fatigue life due to the repeating stress.

Although it is shown in the embodiment of the structure of the third generation, the fourth generation structure may be adopted similarly to the first embodiment wherein the inner raceway surface 25a is directly formed on the shoulder 43 of the outer joint member 41.

Figure 6:
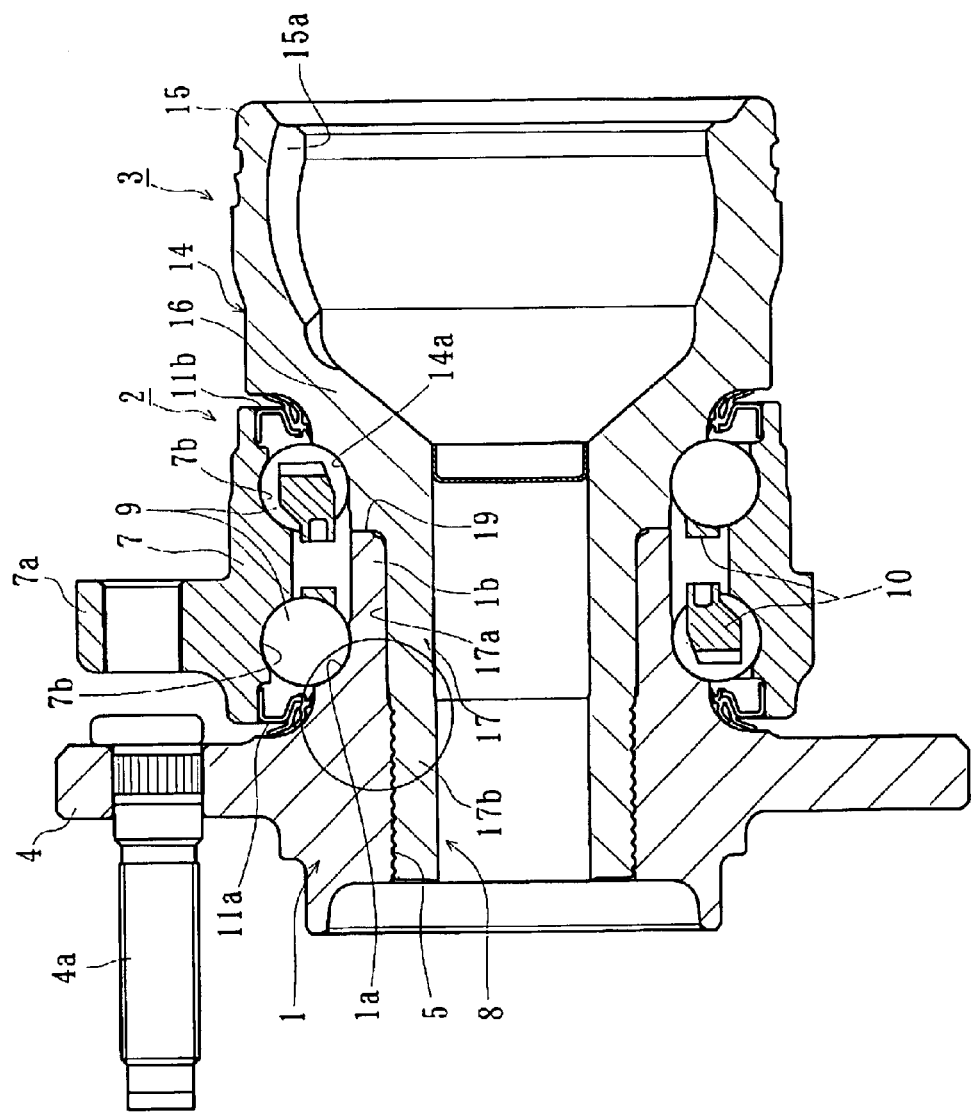
FIG. 6 is a longitudinal section view showing a third embodiment of the bearing apparatus for a driving wheel of the present invention.

FIG. 6 is a longitudinal section view showing a third embodiment of the bearing apparatus for a driving wheel of the present invention. Same reference numerals are used for designating same parts as those used in the aforementioned embodiments.

Figure 7:
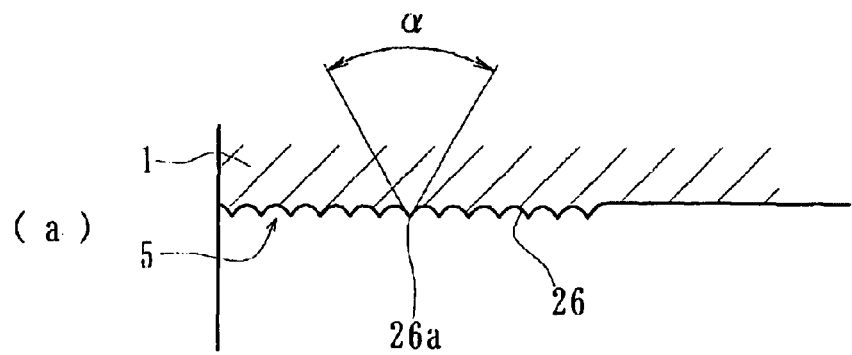
FIG. 7(*a*) is a longitudinal section view showing the annular groove forming irregular portions of the wheel hub of the present invention.
Figure 7:
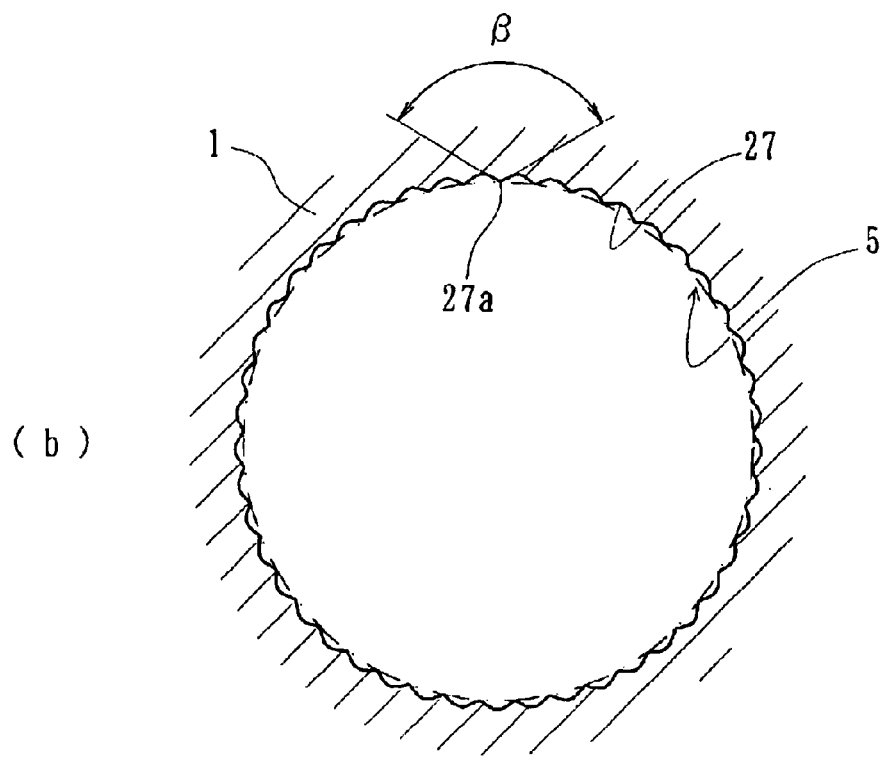

In this bearing apparatus for a driving wheel of a vehicle, the wheel hub 1, a double row rolling bearing 2 and a constant velocity universal joint 3 are assembled as a unit. FIG. 7(a) shows a configuration of cross section of a plurality of independent annular groove 26 formed by turning which is one of the crossed grooves 6' mentioned above. If the apex angle α of each projection 26a is an acute angle, the amount of bite of the projection on the radial expansion is increased and thus the static combining force such as the resistance against separation between the wheel hub 1 and the stem portion 17 is also increased. However, the abutted portion of the wheel hub 1 and the outer joint member 14 functions as a node and suffers from repeated bending moment when excessive bending moment arises during turning of the vehicle. During which, since the area of cross section of each projection 26a suffered from shearing force is decreased, the fatigue life of each projection 26a is also decreased. On the contrary, if the apex angle α of each projection 26a is an obtuse angle, the amount of bite of projection on the radial expansion is decreased because of increase of the resistance against bite of projection and thus the static combining force is also decreased.

FIG. 7(b) shows a configuration of cross section of a plurality of independent axial groove 27 formed by broaching as one of the crossed grooves 6' mentioned above. If the apex angle β of each projection 27a is an acute angle, the amount of bite of the projection on the radial expansion is increased and thus the static combining force such as the power of transmitting torque from the stem portion 17 to the wheel hub is also increased. However, similarly to the annular grooves 26, since the area of cross section of each projection 27a suffered from shearing force is decreased when the repeating bending moment is applied thereto, the fatigue life of each projection 27a is decreased. On the contrary, if the apex angle β of each projection 27a is an obtuse angle, the amount of bite of the projection on the radial expansion is decreased because of increase of the resistance against bite of the projection and thus the static combining force is also decreased.

Figure 8:
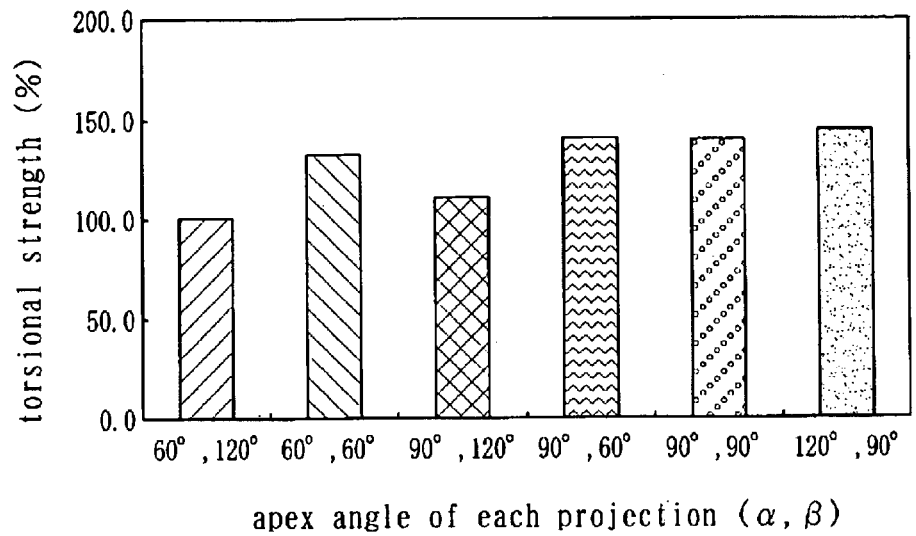
FIG. 8 is a graph showing differences in the torsional strength in differences of the apex angle of projection of the annular groove and the axial groove.
Figure 9:
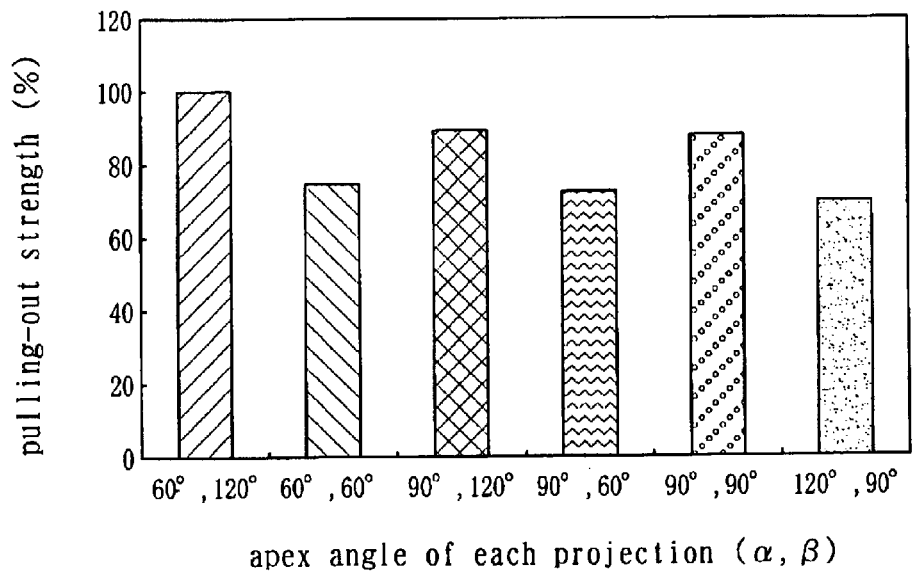
FIG. 9 is a graph showing differences in the torsional strength in differences of the apex angle of projection of the annular groove and the axial groove.
Figure 10:
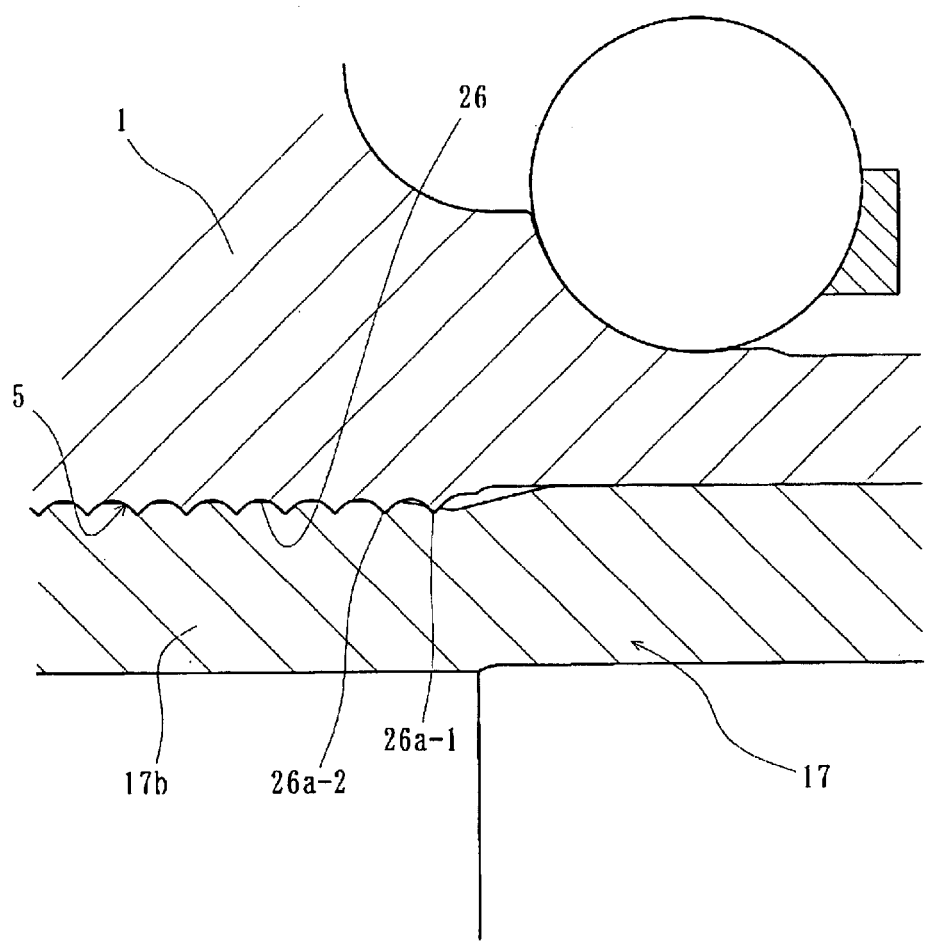
FIG. 10 is an enlarged partial section view for explaining a connecting portion via plastic deformation according to the present invention.

The applicant made samples having different apex angles α of the projections 26a of the annular groove 26 and apex angles β of the projections 27a of the axial groove 27 and carried out tests of the torsional strength (dynamic strength) and the pulling-out strength (static strength) in several combinations of the samples. The results are shown in graphs of FIGS. 8 and 9.

From the results of these tests, it is found that the torsional strength is incresed in case of the obtuse angle (120°>90°>60°) as to the apex angle α of projection 26a of the annular groove 26 and in case of the acute angle (60°>90°>120°) as to the apex angle β of projection 27a of the axial groove 27. On the contrary, it is found that the pulling-out strength is increased in case of the acute angle (60°>90°>120°) as to the apex angle α of projection 26a of the annular groove 26 and in case of the obtuse angle (120°>90°>60°) as to the apex angle β of projection 27a of the axial groove 27. That is, in the annular groove 26 and the axial groove 27, the apex angles α and β of the projections 26a and 27a exhibit an opposite tendency, and accordingly, the pulling-out strength is lowered in case of combinations superior to the torsional strength, and the torsional strength is lowered in case of combinations superior to the pulling-strength.

As previously mentioned, since both the torsional force and the pulling-out force are applied to the connected portion via the plastic deformation in the bearing apparatus for the driving wheel of the vehicle, it is necessary to take the balance of the torsional strength and the pulling-out strength into consideration. Accordingly, it is optimum to set the apex angles α and β of the projections 26a and 27a at substantially 90°. However, since there is sometimes required a specification of vehicle having a high pulling-out strength, it is preferable to appropriately select the apex angle within 90°±30°.

Figure 11:
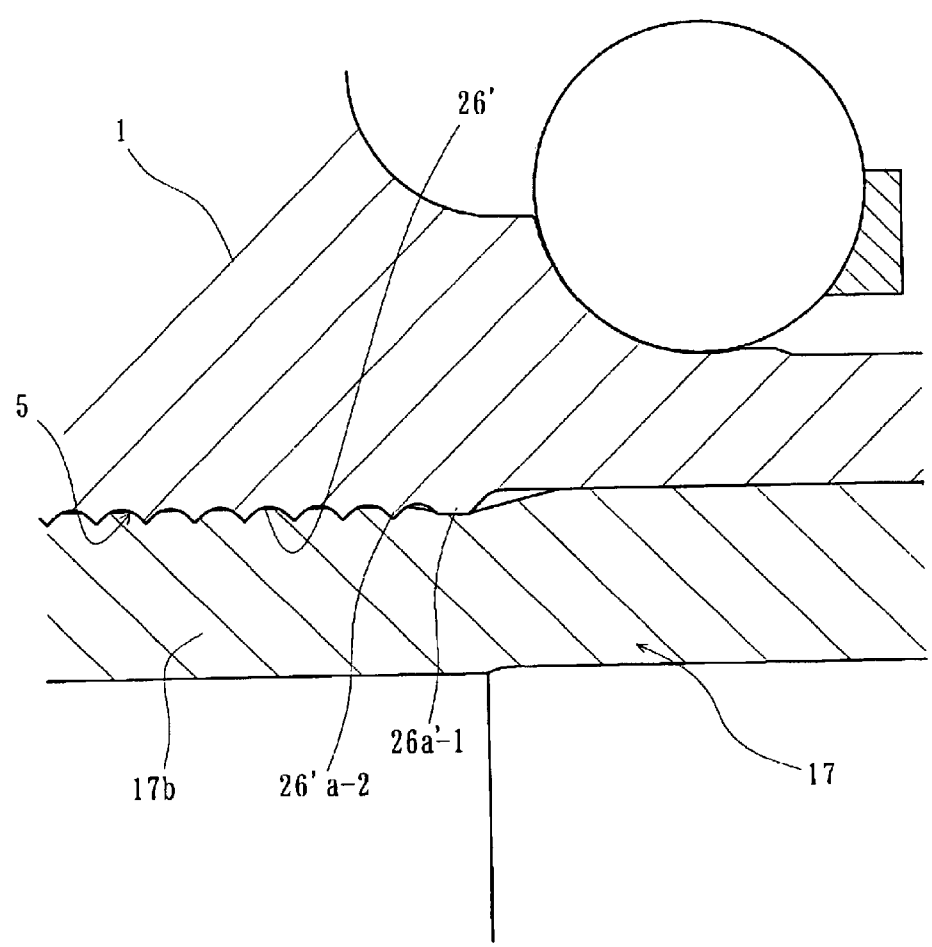
FIG. 11 is an enlarged partial section view for explaining a connecting portion via plastic deformation of the bearing apparatus for a driving wheel according to the present invention.

According to an endurance test made by the applicant, when the connected portion via plastic deformation has sufficient strength, it shows that the transitional portion between the stepped portion of small diameter 17a and the fitting portion 17b formed on the stem portion 17 is the weakest portion and is often damaged by fatigue under a condition in which rotary bending force is applied as an external force. It is supposed that this is because the projection of first row 26a-1 of the annular grooves 26' bites into a minimum diameter portion of the stem portion 17 after the radial expansion. Thus, the stress concentration is generated at the minimum diameter portion when all the projections 26a-2, 26a-3, . . . 26a–n including the projection of first row 26a-1 are formed so that they have the same configuration and dimension. On the contrary, according to the present invention, the projection of first row 26'a-1 of the annular grooves 26' is formed so that it has a diameter larger than that of other projections 26'a-2, 26'a-3, . . . 26'a–n and has an axially flat tip end as shown in FIG. 11. The projection of first row 26'a-1 can contact the fitting portion 17b of the stem portion 17 via the area contact and thus can reduce the stress concentration due to the notch effect. According to the endurance test made by the applicant, it is shown that the life of the apparatus is extended more than 30% as compared to that of apparatus of the prior art only by forming the projection 26'a-1 so that it has a larger diameter than that of other projections 26'a-2, 26'a-3, . . . 26'a–n and has a flat tip end.

The configuration of the projection of first row 26'a-1 of annular projections 26' may be any configuration other than that described above. For example, it may have a rounded tip end.

Figure 12:
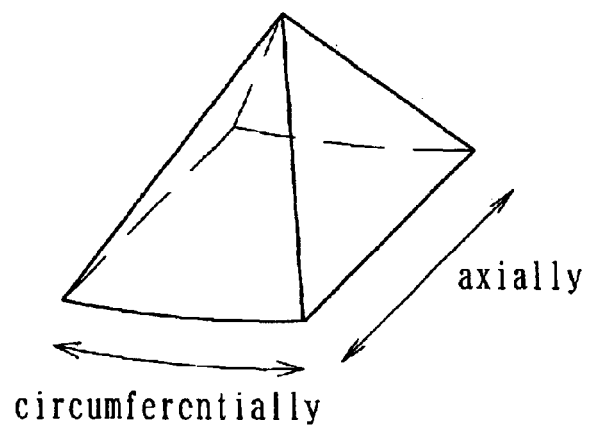
FIG. 12 is a schematic view showing a configuration of the tip end of a projection of the crossed groove according to the present invention.

In the irregular portion 5 formed on the bore surface of the wheel hub 1, the crossed groove 6' shown in FIG. 2 comprises a plurality of independent annular grooves 26 formed by turning and axial grooves 27 formed by broaching. It is most preferable that the inner diameters of the projections 26a (26'a) and 27a of the grooves 26 (26') and 27 perfectly coincides with each other and each crossed groove 6' forms a square pyramid as shown in FIG. 12 in which the heights in circumferential and axial direction of the projection are the same. However, since the crossed grooves 6' are in fact formed by surfaces worked by turning and broaching surfaces and thus it is difficult to control the dimensions of the inner diameters of the projection and to form perfect square pyramids.

Figure 13:
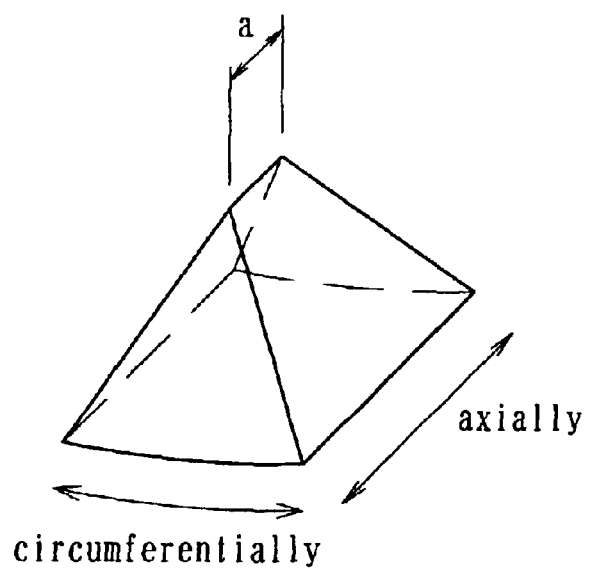
FIG. 13 is a schematic view showing another configuration of the tip end of a projection of the crossed groove according to the present invention.
Figure 14:
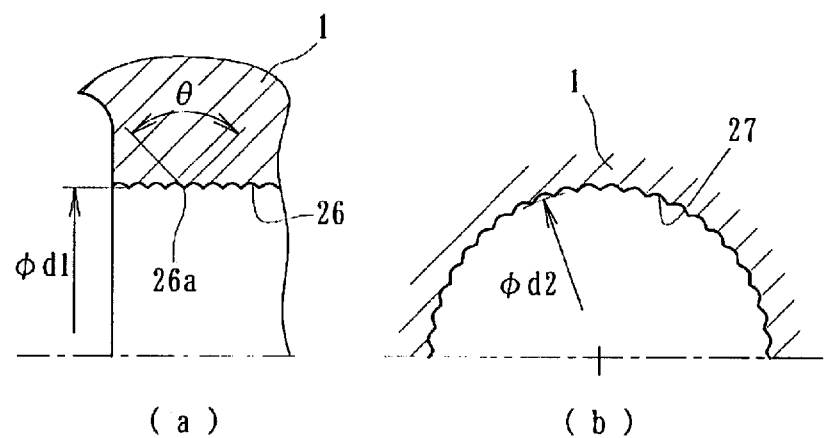
FIG. 14(a) is an explanatory view showing the annular groove forming irregular portions of the wheel hub of the present invention.
FIG. 14(b) is an explanatory view showing the axial groove forming irregular portions of the wheel hub of the present invention.
Figure 15:
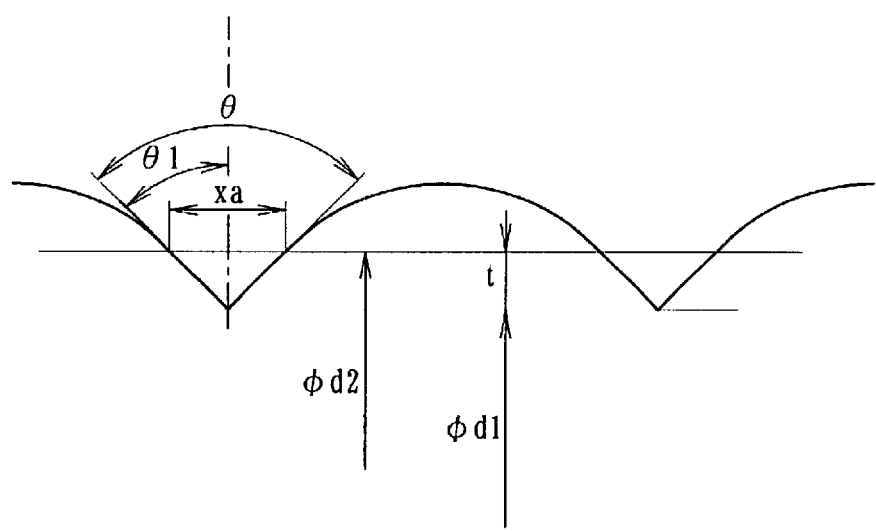
FIG. 15 is an explanatory view showing the annular groove forming irregular portions of the wheel hub of the present invention.

If the crossed grooves 6' are formed by setting the numerical values so that the innermost diameter is formed by the axial grooves 27 formed by broaching, the tip end of the projection is formed by a line not a point as shown in FIG. 13. If the axial innermost diameter of the independent annular grooves 26 (26') is denoted by "φd1" and the circumferential innermost diameter of the axial grooves 27 formed by broaching is denoted by "φpd2" as shown in FIG. 14, the length "a" of a side of the triangle pyramid shown in FIG. 13 can be expressed as ½a=t×tan θ1 (see FIG. 15), wherein "θ1" is a half (½) of the apex angleθ of the projection 26a (26'a) of the annular groove 26 (26'). If assuming the apex angle (θ) of the projection 26a (26'a) is 90°±30°, following relation formula: a=t=0 or $1 \leq a/t \leq \sqrt{3}$ can be obtained. That is, when a=t=0, it becomes a square pyramid shown in FIG. 12, and when not satisfying the relation a=t=0, it becomes a configuration expressed by the formula.

According to the present invention, since the innermost diameter of the projection is set by the axial grooves 27 formed by broaching, it is possible to carry out the dimension control of the irregular portion 5 formed by the crossed grooves 6' using "Between Pins Diameter" (BPD).

Figure 16:
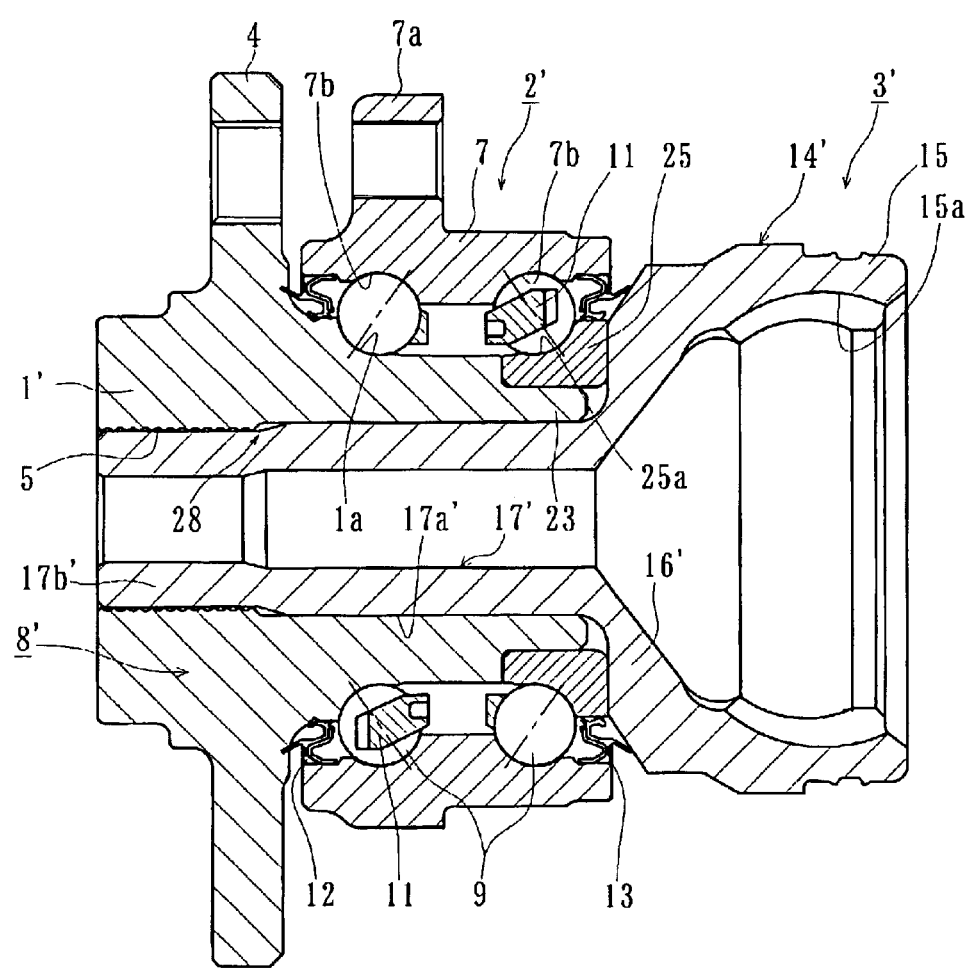
FIG. 16 is a longitudinal section view showing a fourth embodiment of the bearing apparatus for a driving wheel of the present invention.

FIG. 16 is a longitudinal section view showing a fourth embodiment of the bearing apparatus for a driving wheel of the present invention. This embodiment is different only in the structure of the bearing portion from the third embodiment and accordingly same reference numerals are used for designating same parts as those used in the third embodiment. This embodiment has a structure so-called a "third generation" in which the wheel hub 1', the double row rolling bearing 2' and the constant velocity universal joint 3' are assembled as a unit.

The wheel hub 1' is formed integrally with the wheel mounting flange 4 for mounting a wheel (not shown) thereon. Hub bolts secure the wheel and are equidistantly arranged along the periphery of the flange 4. The outer circumferential surface of the wheel hub 1' is formed with the inner raceway surface 1a and the spigot fitting portion 23. The separate inner ring 25 is press fitted onto the spigot portion 23 abutting a shoulder 16' of the outer joint member 14'.

The double row rolling bearing 2' comprises the outer member 7, the inner member 8', and the double row rolling elements 9 and 9. The outer member 7 is integrally formed with the flange 7a to be mounted on a body of vehicle (not shown). The double row outer raceway surfaces 7b and 7b is formed on the inner surface thereof. On the other hand, the inner member 8' comprises the wheel hub 1' and the separate inner ring 25. The double row inner raceway surfaces 1a and 25a are formed on the outer circumferential surfaces of the wheel hub 1' and the inner wheel 25, respectively. The inner raceway surfaces 1a and 25a oppose the double row outer raceway surfaces 7b and 7b. Double row rolling elements 9 and 9 are held by a cage 11 between the outer raceway surfaces 7b and 7b and the inner raceway surfaces 1a and 25a.

The wheel hub 1' is made of medium carbon steel including carbon of 0.40 through 0.60 wt % such as S53C. The wheel hub 1' is hardened on its surface from the seal land portion to the inner raceway surface 1a and the spigot portion 23 to which the seal 12 contacts by the high frequency induction heating. On the other hand, the inner ring 25 is made of high carbon chrome bearing steel including carbon of 0.95 through 1.10 wt % and is hardening treated from the surface to the core thereof.

The outer joint member 14' of the constant velocity universal joint 3' comprises a mouth portion 15, shoulder portion 16' forming the bottom of the mouth portion 15, and a stem portion 17' axially extending from the shoulder 16'. The stem portion 17' comprises the stepped portion of small diameter 17'a and the fitting portion 17'b having a hollow configuration opened to the outboard side.

The outer joint member 14' is made of medium carbon steel including carbon of 0.40 through 0.60 wt % such as S53C. Similarly to the first embodiment, the surfaces of axially extending curved track groove 15a formed on the inner surface of the mouth portion 15, of a region from the shoulder portion 16' to the stepped portion 17'a of the stem portion 17' and a region from the stepped portion 17'a to the transition portion to the fitting portion 17'b are hardened by high frequency induction heating. The fitting portion 17'b remains in its rare condition without any heat treatment.

The bore surface of the wheel hub 1' is formed with a hardened irregular portion 5. The wheel hub 1' and the outer joint member 14' are integrally connected, via the plastic deformation, making the hardened irregular portion 5 of the wheel hub 1' bite into the outer circumferential surface at a fitting portion 17'b of the stem portion 17' by radially outwardly expanding the fitting portion 17'b of the stem portion 17.

Although there have been shown the structures of the third and fourth generations, the present invention may be applied to the structures of the conventional first and second generations, if their structures have connected portions, via plastic deformation, between the wheel hub and the outer joint member at the outboard side of the apparatus. That is, it is possible to increase the static and dynamic strength even if the repeating stress would be caused in the stem portion during the turning of the vehicle.

Figure 17:
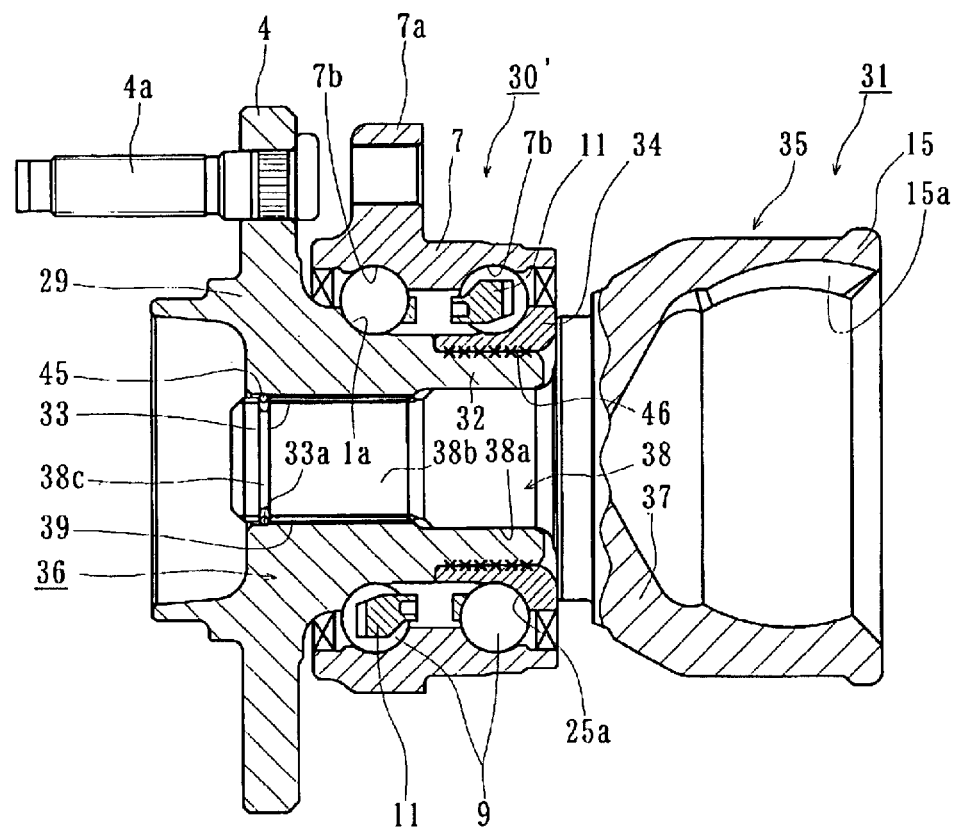
FIG. 17 is a longitudinal section view showing a fifth embodiment of the bearing apparatus for a driving wheel of the present invention.

FIG. 17 is a longitudinal section view showing a fifth embodiment of the bearing apparatus for a driving wheel of the present invention. This embodiment is different from the fourth embodiment only in the structure of the bearing portion and accordingly same reference numerals are used for designating same parts as those used in the third embodiment. This embodiment has a structure so-called a "third generation" in which the wheel hub 29, the double row rolling bearing 30' and the constant velocity universal joint 31 are assembled as a unit.

The wheel hub 29 is formed integrally with the wheel mounting flange 4 for mounting a wheel (not shown) thereon. Hub bolts 4a secure the wheel and are equidistantly arranged along the periphery of the flange 4. The outer circumferential surface of the wheel hub 29 is formed with the inner raceway surface 1a and the spigot fitting portion 32 and the bore of the wheel hub 29 at the outboard side is formed with a serration (or spline) 33. The separate inner ring 34 is press fitted onto the spigot portion 32 and is assembled thereon abutting a shoulder 37 of the outer joint member 35. The wheel hub 29 is hardened on its surface from the seal land portion to the inner raceway surface 1a. However the spigot portion 32 remains as its rare condition without any heat treatment. On the other hand, the inner ring 34 is made of high carbon chrome bearing steel including carbon of 0.95 through 1.10 wt % and is hardening treated from the surface to the core.

The double row rolling bearing 30' comprises the outer member 7, the inner member 36, and the double row rolling elements 9 and 9. The outer member 7 is integrally formed with the flange 7a to be mounted on a body of the vehicle (not shown). The double row outer raceway surfaces 7b and 7b are formed on the inner surface thereof. On the other hand, the inner member 36 comprises the wheel hub 29 and the separate inner ring 34. The double row inner raceway surfaces 1a and 25a are formed on the outer circumferential surfaces of the wheel hub 29 and the inner wheel 34, respectively. The inner raceway surfaces 1a and 25a oppose the double row outer raceway surfaces 7b and 7b. Double row rolling elements 9 and 9 are held by the cage 11 between the outer raceway surfaces 7b and 7b and the inner raceway surfaces 1a and 25a.

The outer joint member 35 of the constant velocity universal joint 31 comprises the mouth portion 15, the shoulder portion 37 forming the bottom of the mouth portion 15, and the stem portion 38 axially extending from the shoulder 37. The stem portion 38 comprises the stepped portion of small diameter 38a and a connecting portion 38b. The outer circumferential portion of the connecting portion 38 is formed with the serration (or spline) 39 and the distal end of the connecting portion 38 is formed with an engaging groove 38c into which a clip 45 is fitted.

The wheel hub 29 and the outer joint member 35 are connected via the clip 45. The clip 45 engages both the engaging grooves 33a and 38c elastically returned therein when the engaging groove 38c corresponds to the engaging groove 33a formed on the serration 33 of the wheel hub 29. Since the clip 45 has a round cross section, it is possible to disengage the wheel hub 29 from the outer joint member 35 due to easy radial contraction and snapping of the clip 45 into the engaging groove 38c by adding a predetermined axial load onto the clip 45. Accordingly, it is possible to detachably connect, in the axial direction via a simple structure, the sub-unit comprising the wheel hub 29 and the rolling bearing 30 and the constant velocity universal joint 31.

Figure 18:
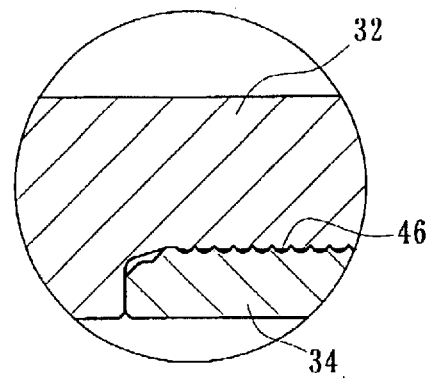
FIG. 18 is an enlarged partial section view of FIG. 17.
Figure 19:
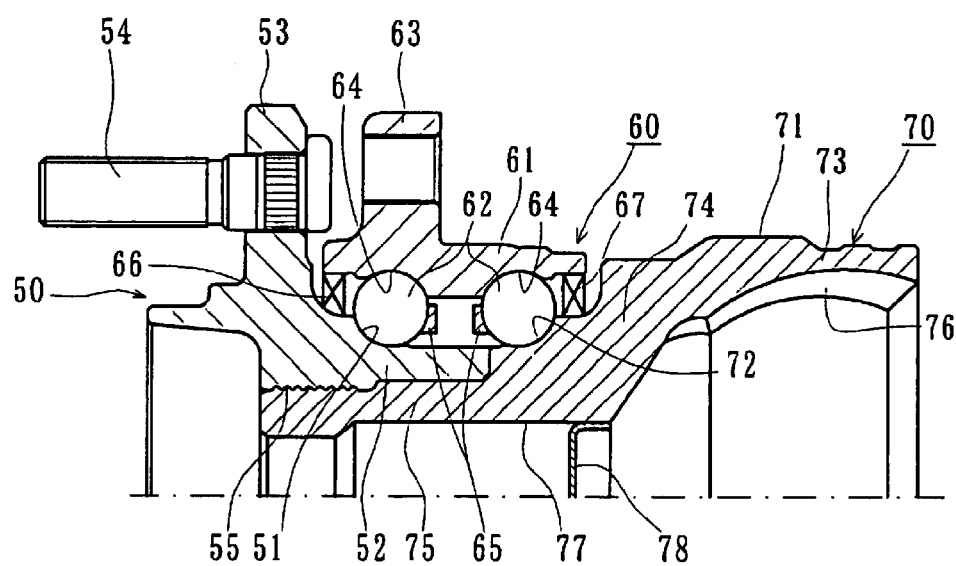
FIG. 19 is a longitudinal section view showing the bearing apparatus for a driving wheel of the prior art.
Figure 20:
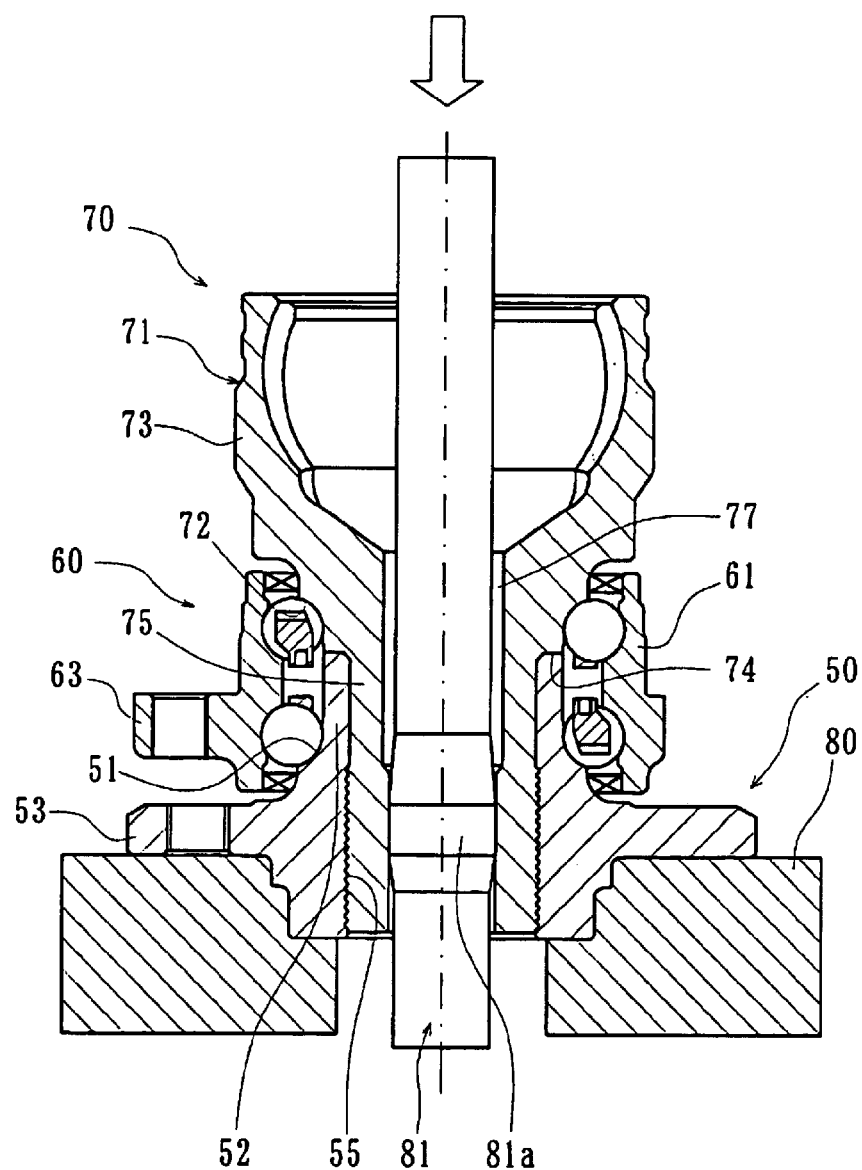
FIG. 20 is an explanatory view showing the method for radial expansion.

In this embodiment, as shown in FIG. 18, the inner ring 34 and the wheel hub 29 are integrally connected via the plastic deformation. The bore surface of the inner ring 34 is formed with a hardened irregular portion 46 and making the hardened irregular portion 46 to bite into the outer circumferential surface at a fitting portion of the wheel hub 29 by radially outwardly expanding the spigot portion of the wheel hub. The irregular portion 46 is formed by a plurality of independent annular grooves formed by turning and a plurality of axial grooves formed by broaching. The projection of first row of the circumferential grooves is configured such that it can reduce the stress concentration when the irregular portion 46 bites into the outer circumferential surface of the spigot portion of the wheel hub 29.

The bearing apparatus for a driving wheel of vehicle of the present invention has the following superior effects: (i) Looseness in the connected portion is not caused by the bending moment applied thereto and sufficient durability can be obtained although repeating tensile and compressive stresses are applied to the fitting portion of the outer joint member; (ii) Reduction of the weight and size of the apparatus as well as the sufficient rigidity compared to the rigid structure can be attained when the outer joint member is formed as a hollow member having the bottom thereof; (iii) The cost can be reduced because of elimination of special hardening step; (iv) The stress concentration can be reduced by the provision of the projection of first row of the circumferential grooves specially configured to reduce the stress concentration; (v) It is possible to provide a so-called "self-retained" type bearing apparatus of the third generation which has sufficient strength of the connected portion via the plastic deformation against a large bending moment applied thereto.

It is intended that the present invention is construed as including all alternations and modifications insofar as they come within the scope of the appended claims or the equivalent thereof.

What is claimed is:

1. A bearing apparatus for a driving wheel of a vehicle for rotatably supporting the driving wheel relative to a body of the vehicle comprising:

a wheel hub, integrally formed with a wheel mounting flange, a constant velocity universal joint and a double row rolling bearing assembled as a unit;

a separate inner ring is press fitted on a cylindrical portion of the wheel hub; and an outer joint member of the constant velocity universal joint is fitted within the wheel hub;

a bore surface of the wheel hub is formed with a hardened irregular portion;

the wheel hub and the outer joint member are integrally connected making the hardened irregular portion of the wheel hub bite into the outer circumferential surface at a fitting portion of the outer joint member by radially outwardly expanding the fitting portion of the outer joint member; and the hardness of the bore surface of the fitting portion of the outer joint member is higher than that of the core portion of the fitting portion of the outer joint member at least by 3 HRC.

2. A bearing apparatus of claim 1 wherein the bore surface of the fitting portion of the outer joint member is hardened by its own work-hardening caused by insertion of an expanding member being hardening treated into a bore formed by said inner circumferential surface of the fitting portion of the outer joint member.

3. A bearing apparatus of claim 1 wherein a hardened surface is formed on the bore surface of the fitting portion of the outer joint member by shot peening.

4. A bearing apparatus of claim 1 wherein the irregular portion is formed by substantially orthogonally crossed grooves comprising grooves in the circumferential direction and grooves in the axial direction; an apex angle of each projection formed by the crossed grooves is substantially 90°; and a projection of first row of the circumferential grooves is configured such that it can reduce the stress concentration when the irregular portion bites into the outer circumferential surface at a fitting portion of the outer joint member.

5. A bearing apparatus for a driving wheel of vehicle comprising:

a wheel hub, integrally formed with a wheel mounting flange, a constant velocity universal joint and a double row rolling bearing assembled as a unit;

a separate inner ring is press fitted on a cylindrical portion of the wheel hub;

a stem portion formed on an outer joint member of the constant velocity universal joint is fitted within the wheel hub;

the bore surface of the wheel hub is formed with a hardened irregular portion;

the wheel hub and the outer joint member are integrally connected via plastic deformation making the hardened irregular portion of the wheel hub bite into the outer circumferential surface at a fitting portion of the outer joint member by radially outwardly expanding the fitting portion of the outer joint member;

the irregular portion is formed by substantially orthogonally crossed grooves comprising grooves in the circumferential direction and grooves in the axial direction;

apex angle of each projection formed by the crossed grooves is substantially 90°; and a projection of a first row of the circumferential grooves is configured such that it can reduce the stress concentration when the irregular portion bites into the outer circumferential surface at a fitting portion of the outer joint member.

6. A bearing apparatus for a driving wheel of vehicle comprising:

a wheel hub, integrally formed with a wheel mounting flange, a constant velocity universal joint and a double row rolling bearing assembled as a unit;

one of the inner raceway surfaces of the double row rolling bearing is formed on the outer circumferential surface of the wheel hub and the other of the inner raceway surfaces is formed on the outer circumferential surface of the outer joint member;

a stem portion formed on an outer joint member is fitted within the wheel hub;

a bore surface of the wheel hub is formed with a hardened irregular portion; the wheel hub and the outer joint member are integrally connected via plastic deformation making the hardened irregular portion of the wheel hub to bite into the outer circumferential surface at a fitting portion of the outer joint member by radially outwardly expanding the fitting portion of the outer joint member;

the irregular portion is formed by substantially orthogonally crossed grooves comprising grooves in the circumferential direction and grooves in the axial direction;

an apex angle of each projection formed by the crossed grooves is substantially 90°; and a projection of a first row of the circumferential grooves is configured such that it can reduce the stress concentration when the irregular portion bites into the outer circumferential surface at a fitting portion of the outer joint member.

7. A bearing apparatus for a driving wheel of vehicle comprising:

a wheel hub, integrally formed with a wheel mounting flange, a constant velocity universal joint and a double row rolling bearing assembled as a unit;

a separate inner ring is press fitted on a cylindrical portion of the wheel hub; a bore surface of the inner ring is formed with a hardened irregular portion;

the wheel hub and the inner ring are integrally connected via plastic deformation with making the hardened irregular portion of the inner ring bite into the cylindrical portion of the wheel hub by radially outwardly expanding the cylindrical portion of the wheel hub;

the irregular portion is formed by substantially orthogonally crossed grooves comprising grooves in the circumferential direction and grooves in the axial direction;

an apex angle of each projection formed by the crossed grooves is substantially 90°; and a projection of a first row of the circumferential grooves is configured such that it can reduce the stress concentration when the irregular portion bites into the outer circumferential surface at a fitting portion of the outer joint member.

8. A bearing apparatus of claim 7 wherein the stem portion of the outer joint member is inserted into the wheel hub via serrations; an engaging groove is formed in each of the serrations at the outboard side thereof; and the wheel hub and the outer joint member are detachably mounted to each other via a split clip to be fitted within the engaging grooves.

9. A bearing apparatus of claim 8 wherein the projection of first row of the circumferential grooves is configured such that each of the projections has an axially extending flat tip end.

10. A bearing apparatus of claim 8 wherein the irregular portion is formed by substantially orthogonally crossed grooves comprising a plurality of independent annular grooves formed by turning and a plurality of axially extending grooves formed by broaching; and the innermost diameter formed by the projection the crossed grooves is formed by the axially extending grooves.

11. A bearing apparatus of claim 10 wherein the configuration of each tip end of projections of the crossed grooves is substantially a square pyramid.

12. A bearing apparatus for a driving wheel of a vehicle for rotatably supporting the driving wheel relative to a body of the vehicle comprising:

a wheel hub, integrally formed with a wheel mounting flange, a constant velocity universal joint and a double row rolling bearing assembled as a unit;

a separate inner ring is press fitted on a cylindrical portion of the wheel hub; and an outer joint member of the constant velocity universal joint is fitted within the wheel hub;

a bore surface of the wheel hub is formed with a hardened irregular portion;

the wheel hub and the outer joint member are integrally connected making the hardened irregular portion of the wheel hub bite into the outer circumferential surface at a fitting portion of the outer joint member by radially outwardly expanding the fitting portion of the outer joint member; and the hardness of the bore surface of the fitting portion of the outer joint member is higher than that of the core portion of the fitting portion of the outer joint member and is set within a range of 25 through 40 NRC.

* * * * *